(12) United States Patent
Kluttz et al.

(10) Patent No.: US 9,310,958 B2
(45) Date of Patent: Apr. 12, 2016

(54) DOCK FOR FAVORITE APPLICATIONS

(75) Inventors: Karen R. Kluttz, Raleigh, NC (US);
James A. Hunt, Chapel Hill, NC (US);
David Rivera, Durham, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 328 days.

(21) Appl. No.: 13/151,860

(22) Filed: Jun. 2, 2011

(65) Prior Publication Data
US 2012/0311498 A1     Dec. 6, 2012

(51) Int. Cl.
*G06F 3/048* (2013.01)
*G06F 3/0481* (2013.01)
*G06F 3/0482* (2013.01)

(52) U.S. Cl.
CPC ............ *G06F 3/0481* (2013.01); *G06F 3/0482* (2013.01); *G06F 3/04817* (2013.01)

(58) Field of Classification Search
CPC .. G06F 3/0481; G06F 3/04817; G06F 3/0482
USPC ......................................... 715/825, 834, 835
See application file for complete search history.

(56) References Cited

U.S. PATENT DOCUMENTS

| | | | |
|---|---|---|---|
| 6,266,098 B1 * | 7/2001 | Cove et al. ..................... | 348/563 |
| 6,710,771 B1 * | 3/2004 | Yamaguchi et al. .......... | 345/184 |
| 7,134,094 B2 * | 11/2006 | Stabb et al. .................... | 715/827 |
| 2005/0160377 A1 * | 7/2005 | Sciammarella et al. ...... | 715/838 |
| 2006/0095865 A1 * | 5/2006 | Rostom .......................... | 715/810 |
| 2006/0161889 A1 * | 7/2006 | Stabb et al. .................... | 717/113 |
| 2007/0044035 A1 * | 2/2007 | Amadio et al. ............... | 715/781 |
| 2007/0136681 A1 * | 6/2007 | Miller ............................ | 715/782 |
| 2009/0204915 A1 * | 8/2009 | Yamagami et al. ........... | 715/764 |
| 2010/0333029 A1 * | 12/2010 | Smith et al. .................... | 715/834 |
| 2010/0333030 A1 * | 12/2010 | Johns ............................. | 715/834 |
| 2011/0105187 A1 * | 5/2011 | Dobroth et al. ............... | 455/566 |
| 2011/0202838 A1 * | 8/2011 | Han et al. ....................... | 715/702 |
| 2011/0252380 A1 * | 10/2011 | Chaudhri ....................... | 715/836 |
| 2012/0095878 A1 * | 4/2012 | Feldman et al. .............. | 705/27.1 |
| 2012/0204131 A1 * | 8/2012 | Hoang et al. .................. | 715/835 |
| 2012/0216146 A1 * | 8/2012 | Korkonen ...................... | 715/835 |
| 2012/0254198 A1 * | 10/2012 | Shih et al. ...................... | 707/751 |
| 2012/0284673 A1 * | 11/2012 | Lamb et al. .................... | 715/863 |

* cited by examiner

*Primary Examiner* — Anil Bhargava
(74) *Attorney, Agent, or Firm* — Ference & Associates LLC (57) ABSTRACT

Systems, methods and products are described that provide a dock for favorite applications. One aspect includes providing a dock point on a display device of an information handling device; responsive to user input associated with said dock point, launching a utility organizing a sub-set of user applications installed on said information handling device in a predetermined arrangement of launch points; providing an animated movement of said launch points in said utility responsive to user input; and responsive to user input selecting a launch point in said utility, launching an application associated with said launch point on the information handling device. Other embodiments are described.

20 Claims, 8 Drawing Sheets

DOCK FOR FAVORITE APPLICATIONS

BACKGROUND

Various software applications ("apps") for use with information handling devices, such as smart phones and tablet/slate computers, are available. Software for mobile electronic devices often includes for example operating system(s), middleware and/or applications for operating the devices. For example, ANDROID operating system is software for mobile devices provided by Google Inc. Many software developers create and make available applications ("apps") that extend the functionality of the devices when implemented along with ANDROID operating system. Much the same occurs with other operating systems for use with other devices, such as those developed by Apple Inc. ANDROID is a registered trademark of Google, Inc. in the United States and other countries.

Applications may be downloaded to and installed on the devices for increasing and customizing their functionality. Applications are quite popular and provide a wide range of functionality to the devices. Users often download and install many (tens to hundreds) of applications to their mobile device in order to personalize the mobile device for use.

BRIEF SUMMARY

In summary, one aspect provides a method comprising: providing a dock point on a display device of an information handling device; responsive to user input associated with said dock point, launching a utility organizing a sub-set of user applications installed on said information handling device in a predetermined arrangement of launch points; providing an animated movement of said launch points in said utility responsive to user input; and responsive to user input selecting a launch point in said utility, launching an application associated with said launch point on the information handling device.

Another aspect provides a system comprising: one or more processors; and a display device; wherein, responsive to execution of computer program instructions accessible to the one or more processors, the one or more processors are configured to: provide a dock point on the display device of said system; responsive to user input associated with said dock point, launch a utility organizing a sub-set of user applications installed on said system in a predetermined arrangement of launch points; providing an animated movement of said launch points in said utility responsive to user input; and responsive to user input selecting a launch point in said utility, launching an application associated with said launch point on the system.

A further aspect provides a computer program product comprising: a computer readable storage medium having computer readable program code embodied therewith, the computer readable program code comprising: computer readable program code configured to provide a dock point on a display device of an information handling device; computer readable program code configured to, responsive to user input associated with said dock point, launch a utility organizing a sub-set of user applications installed on said information handling device in a predetermined arrangement of launch points; computer readable program code configured to provide an animated movement of said launch points in said utility responsive to user input; and computer readable program code configured to, responsive to user input selecting a launch point in said utility, launch an application associated with said launch point on the information handling device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 4(A-B) illustrates example utilities.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation.

With the growing popularity of applications, users often download many such applications to a device. For example, it is not uncommon for a user to have downloaded dozens of applications to his or her information handling device, such as a mobile device, a smart phone, tablet/slate computer, et cetera. Given this, users are confronted with an organization problem with respect to the applications resident on the device. It is typical, for example, for a user to have a sub-set of applications that he or she uses more frequently (favorite applications). Often, these fall into more than one logical category (work applications, social media applications, et cetera). While users may attempt to place their favorite applications on a particular page (or view) of the device, it may be difficult to accurately configure a page to hold the most used applications, and it may be too time consuming to do so.

Accordingly, an embodiment provides a convenient means by which a user can quickly access his or her favorite applications, irrespective of the current screen or view. An embodiment provides a consistent launch point, termed herein a "dock point", by which the user can easily launch (start, initiate) a utility that makes accessible his or her favorite sub-set of applications. An embodiment provides for easy editing of such a utility to add, remove, and change applications (and their ordering) appearing therein.

The illustrated example embodiments will be best understood by reference to the figures. The following description is intended only by way of example, and simply illustrates certain example embodiments.

Figure 1:
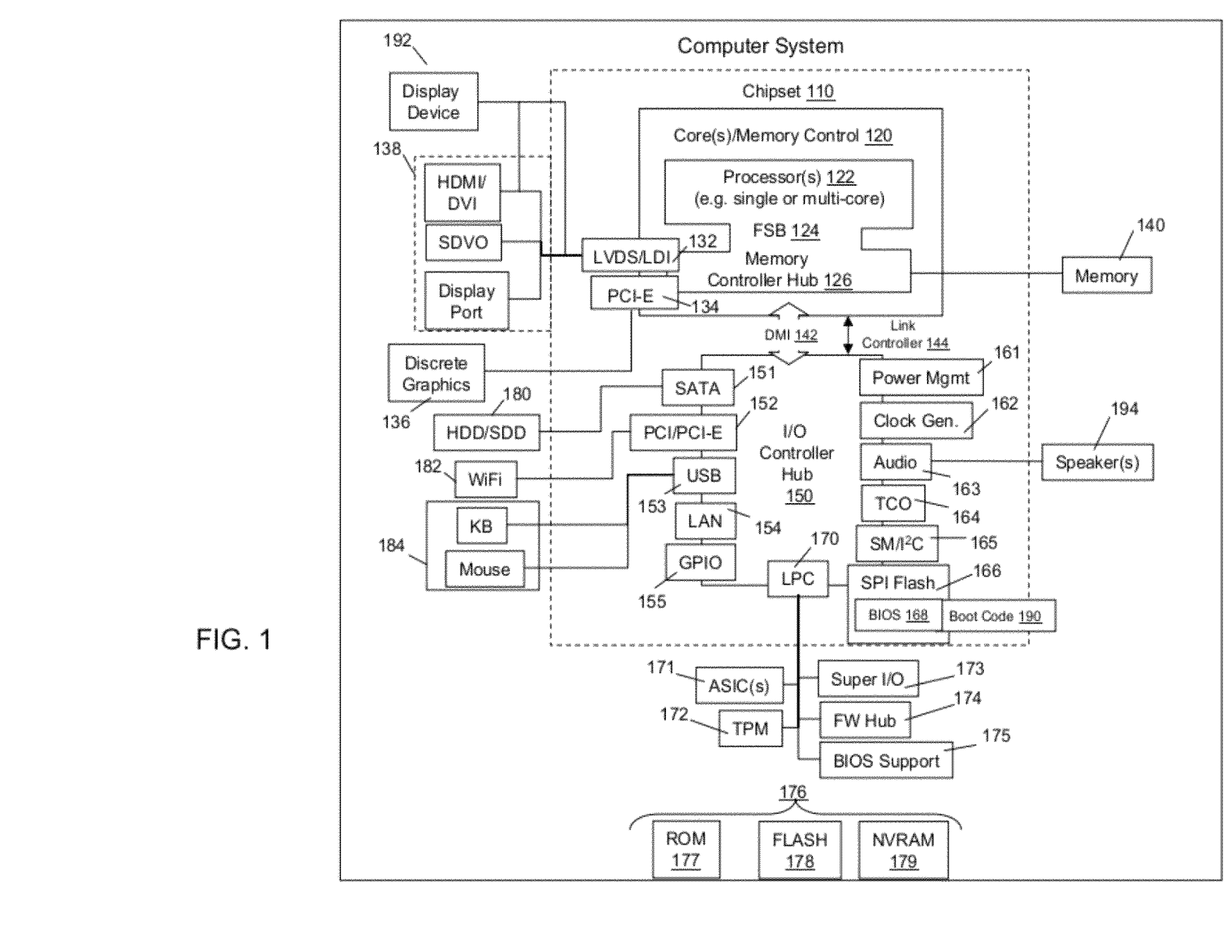
FIG. 1 illustrates an example circuitry of a computer system.

While various other circuits, circuitry or components may be utilized, FIG. 1 depicts a block diagram of one example of computing system circuits, circuitry or components. The example depicted in FIG. 1 may correspond to computing systems such as the THINKPAD series of personal computers sold by Lenovo (US) Inc. of Morrisville, N.C., or other devices such as smart phones, tablet devices, and the like, as noted below. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, a projector, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for input devices 184 such as a digitizer, keyboard, mice, cameras, phones, storage, other connected devices, et cetera.), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

For example, with regard to smart phone and/or tablet circuitry, an example includes an ARM based system (system on a chip) design. Internal busses and the like depend on different vendors, but essentially all the peripheral devices may attach to a single chip. In contrast to the circuitry illustrated in FIG. 1, the tablet circuitry combines the processor, memory control, and I/O controller hub all into a single chip. Also, ARM based systems do not typically use SATA or PCI or LPC. Common interfaces for example include SDIO and I2C. There are power management chips, and in the at least one design, a single chip is used to supply BIOS like functionality and DRAM memory.

Figure 2:
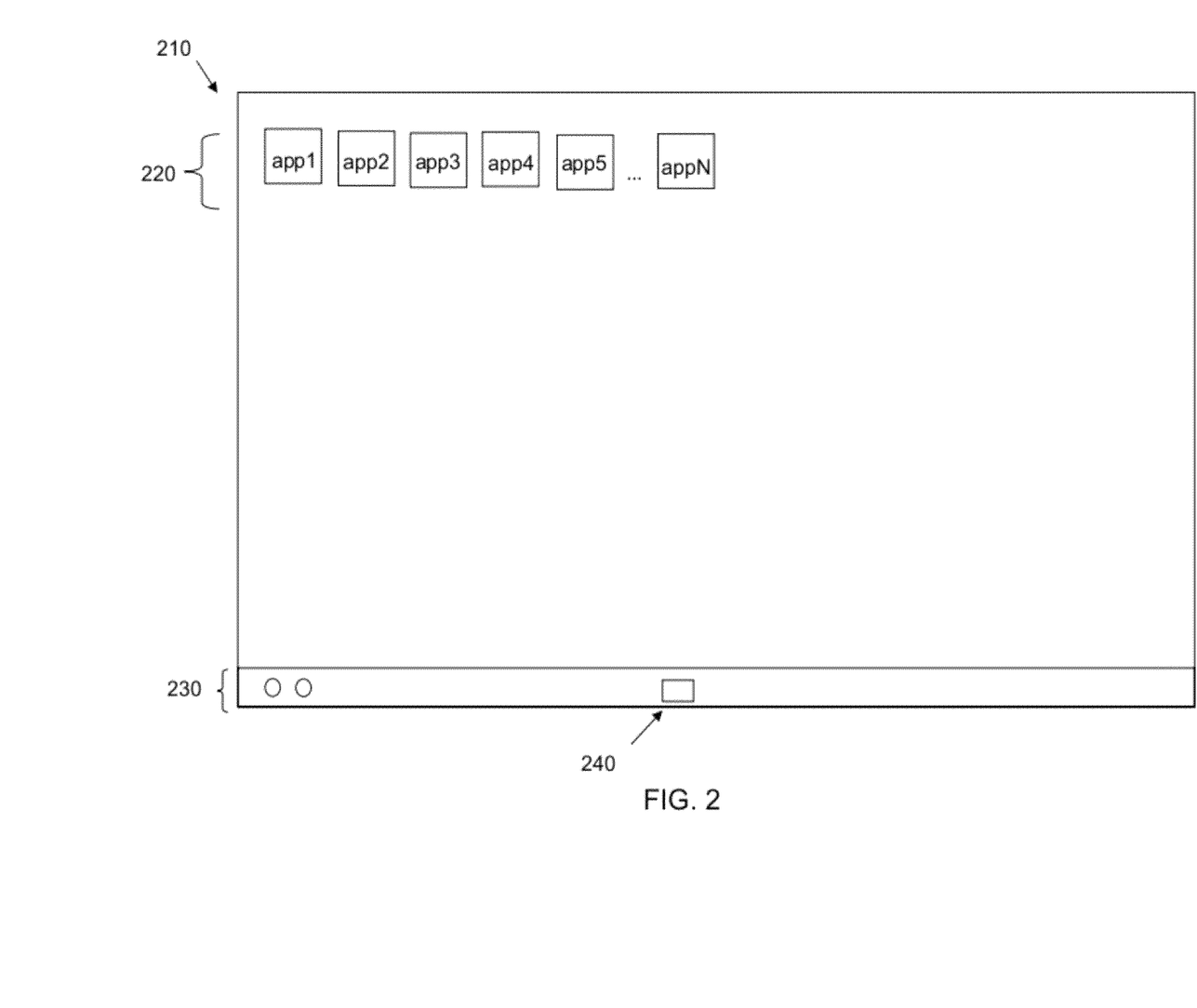
FIG. 2 illustrates an example desktop view and docks.

Referring to FIG. 2, an example display is illustrated. The example display 210, which for example may appear on a touchscreen display of a mobile device (such as a tablet-computing device running Honeycomb, a version of the ANDROID operating system), includes a plurality of application icons 220 for applications installed on the device. Here, the application icons 220 shown are those of the "home screen", which is the screen or view the user obtains on starting the device and returns to through pushing a "home" button, which may be provided as a dock point in a tool bar 230. The user may have more applications installed, the icons of which would appear on other screens that the user may navigate to (for example, left or right views), by appropriately interfacing with the device, such by dragging a finger across the home screen in the desired direction, operating an optical trackball, et cetera.

On the display 210, a toolbar 230 appears, situated in this example at the bottom of the view. This toolbar 230 is a constant that appears even if the user switches to another screen (other than the home screen). That is, the remainder of the view is updated save this toolbar, 230, which remains constant. Often such a toolbar 230 (or like indicator) is overlaid on the view, with the underlying view contents appearing to travel underneath the toolbar 230 as the user scrolls through the screens. The toolbar 230 includes one or more dock points, which are icons that constantly appear and launch specific functions/applications. An embodiment adds a dock 240 to the toolbar 230 to manage or launch a favorite application utility.

The dock point enhancement may be implemented for example as modifications of the toolbar 230 using built-in API's (for example, as provided by Google, Inc.). The concept is to provide a persistent way for users to quickly access their favorite applications from any visible desktop (screen or view).

Figure 3:
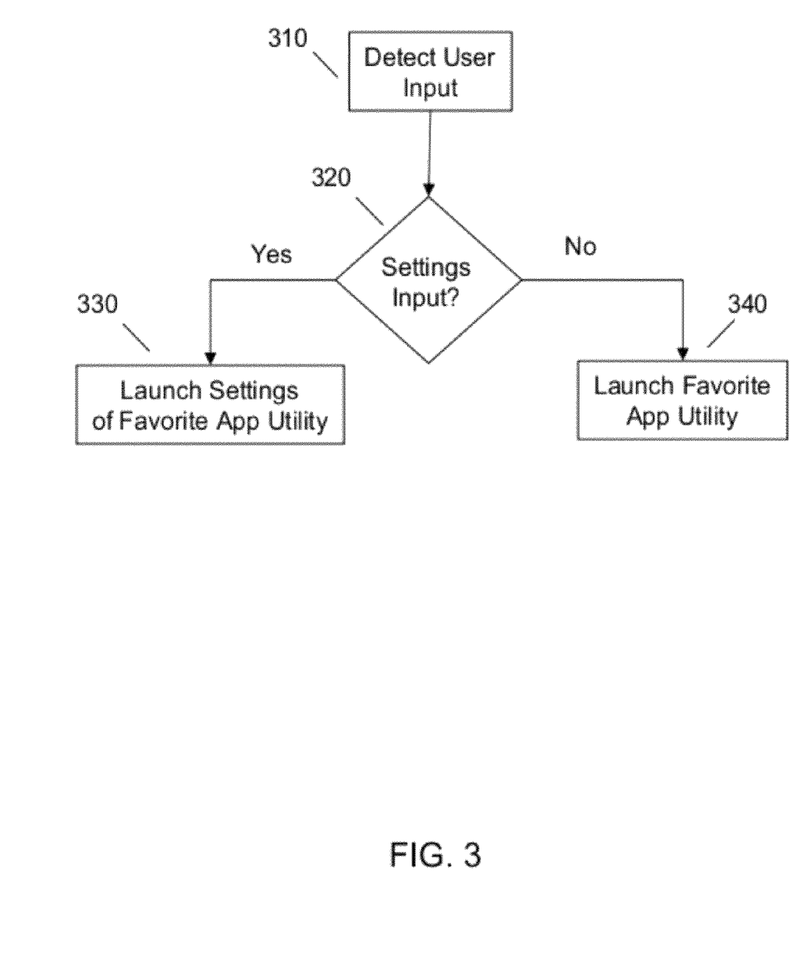
FIG. 3 illustrates an example flow for opening a settings editing arrangement and an application launch function.

A user may interface with this dock point 240 to manage organization of his or her favorite applications in the utility and/or to launch the favorite applications utility. Referring to FIG. 3, for example, the user may interface with a display device having a touchscreen functionality in order to press or provide input to the dock point 310. Responsive to detecting user input, such as via a touchscreen device, an embodiment detects whether the input is a settings input 320, for example a press and hold or "firm" press on the dock point 240. If yes, the settings management view (editing arrangement) of the favorite applications utility may be launched 330. If no, for example a short tap on the dock point 240, the new application utility may be launched using existing settings 340.

For opening and closing the favorite applications utility, a wide variety of appearance and animation may be provided. The favorite applications utility may be launched with a tap or click on the favorite applications icon (dock, dock point) 240 appearing in the toolbar 230. This icon 240 may be implemented as a toggle. That is, when the favorite applications utility is closed, a short tap on the icon 240 will open it. When the favorite applications utility is open, a short tap on the icon 240 will close it. The favorite applications utility may also time out, for example by an animated fading away of the favorite applications utility if the user does not take any action for a predetermined time, for example within 2 seconds.

Figure 4A:
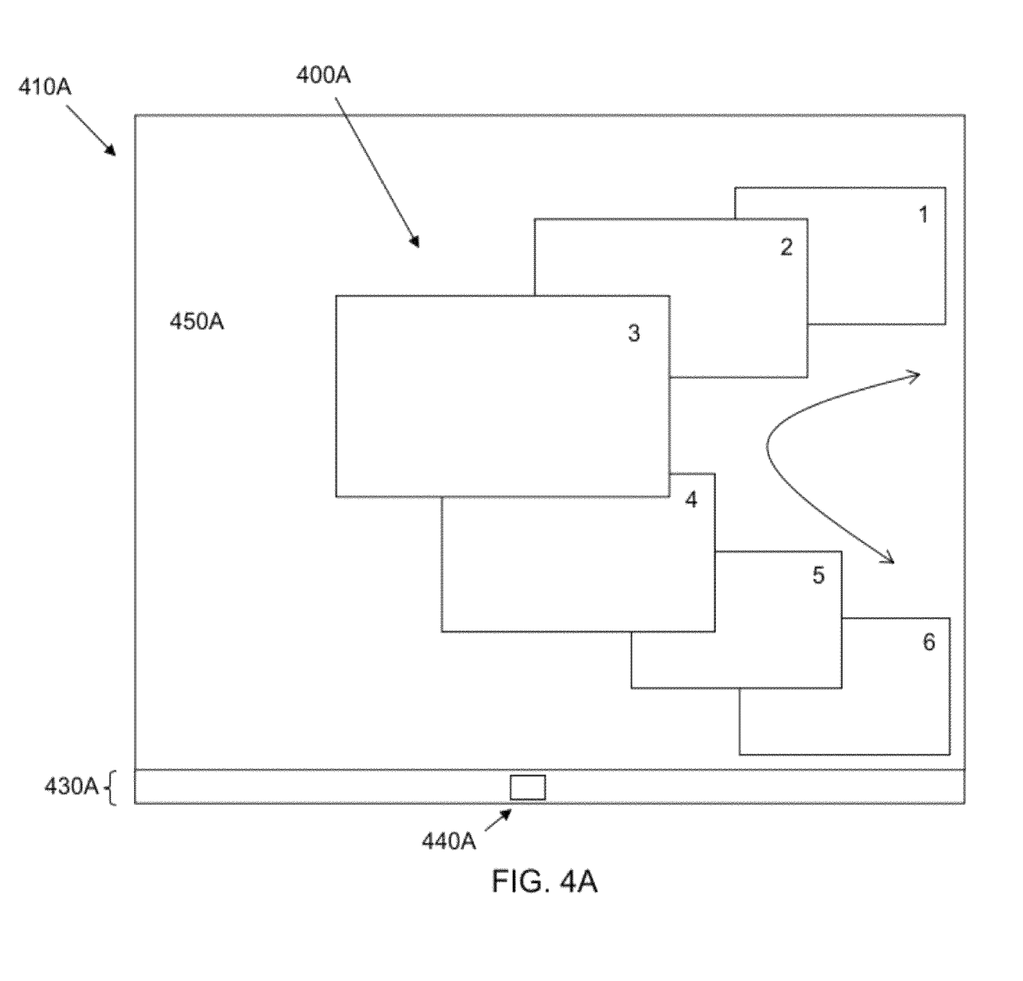

FIG. 4A illustrates an example favorite applications utility 400A. Responsive to launching the favorite applications utility 400A, the favorite applications utility 400A may contain a number of application launch points (1-6) displayed on the display screen. FIG. 4A illustrates for example six (6) launch points (1-6). Each launch point (1-6) may contain layers, such as a screen capture of the favorite application, the application's product icon, an outline (for example, white), and a drop shadow (for example, five (5) pixels) arranged in a shape (for example, the wheel shape indicated by arrow for illustration purposes only). The size and shape of the launch points (1-6) may change, for example to create the animation/illusion of a 3D wheel that rotates as the user scrolls the wheel (for example, with his or her finger via a touchscreen). The launch points closest to the bottom and right side of the wheel shape, as illustrated in FIG. 4A, may appear smaller, as illustrated. The size of the launch points (1-6) may increase/decrease as the user moves them about the wheel animation, for example as illustrated with the largest launch point size being applied to the launch point in the centered ((3) in this example).

When the utility 400A is launched the background view 450A may fade quickly. The launch points (1-6) may then slide up and out of the toolbar 430A rapidly, arching over into the desktop 450A and back to the right of the screen, for example with a ballooning or rubber band effect (although the images need not be distorted, but may simply be resized). The top of the first launch point (1), which may be the first to appear on the screen, may be approximately 370 pixels above the toolbar 430A. Such animation may take for example approximately 0.25 seconds. A translucent background in area 450A may be used to ensure the launch points (1-6) are clearly visible above any application icons and/or widgets resident on the desktop view on which the favorite applications utility is launched. When closed, the favorite application utility 400A may fade away quickly, for example in approximately 0.25 seconds.

FIG. 4A illustrates an example of the order of launch points (1-6) if a wheel shape is implemented. The first launch point (1) may be sized as 97 pixels wide by 60 pixels tall. Launch point (2) may be sized as 130 pixels wide by 80 pixels tall. Launch point (3) may be sized as 160 pixels wide, by 100 pixels tall. Launch point (4) may be sized as 130 pixels wide by 80 pixels tall. Launch point (5) may be sized as 97 pixels wide by 60 pixels tall. Launch point (6) may be sized as 65 pixels wide by 40 pixels tall. The user may navigate through the favorite application utility 400A by "spinning" the wheel clockwise or counterclockwise (as indicated by the arrow in FIG. 4A) using up or down gestures with a fingertip. For example, an upward gesture may turn the wheel clockwise. A downward gesture may turn the wheel counterclockwise, et cetera.

Figure 4B:
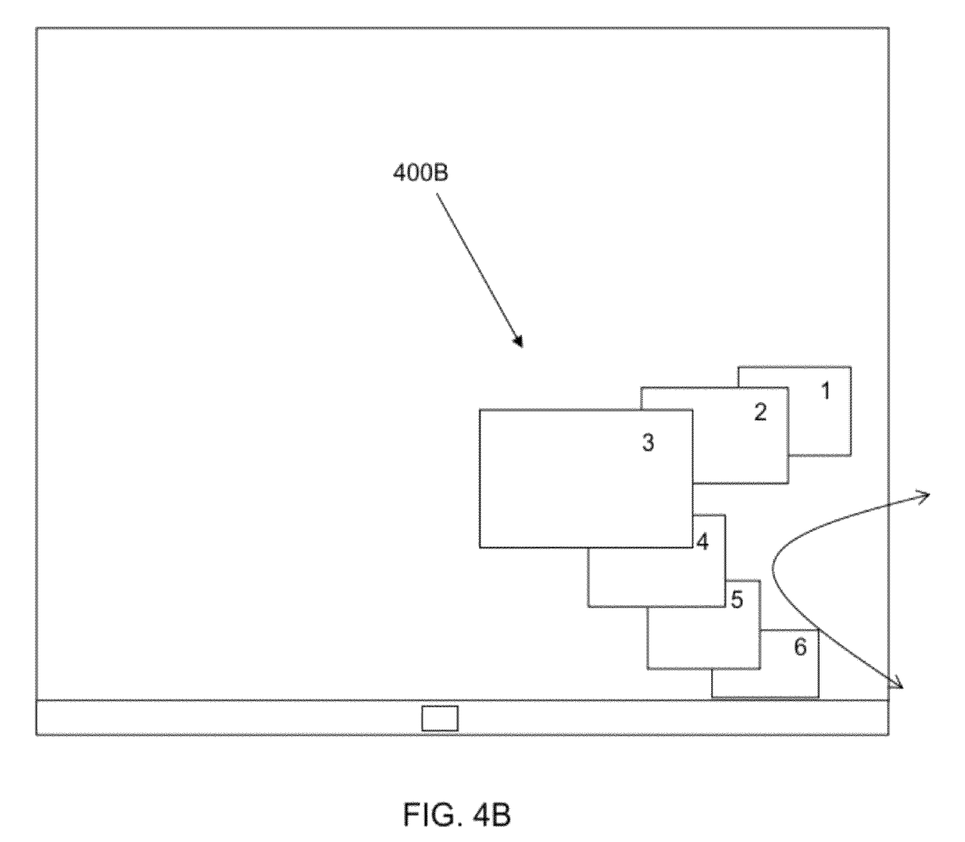

Referring to FIG. 4B, another example favorite applications utility 400B is illustrated. Responsive to launching the favorite applications utility 400B, the favorite applications utility 400B may contain a number of application launch points (1-6) displayed on the display screen. FIG. 4B illustrates for example six (6) launch points (1-6). Each launch point (1-6) may contain layers, such as a screen capture of the favorite application, the application's product icon, an outline (for example, white), and a drop shadow (for example, five (5) pixels) arranged in a shape (for example, the wheel shape indicated by arrow for illustration purposes only). The size and shape of the launch points (1-6) may change, for example to create the animation/illusion of a 3D wheel that rotates as the user scrolls the wheel (for example, with his or her finger via a touchscreen). In this example, the 3D wheel is smaller than in FIG. 4B and is centered about a corner (right) of the display device.

Figure 5:
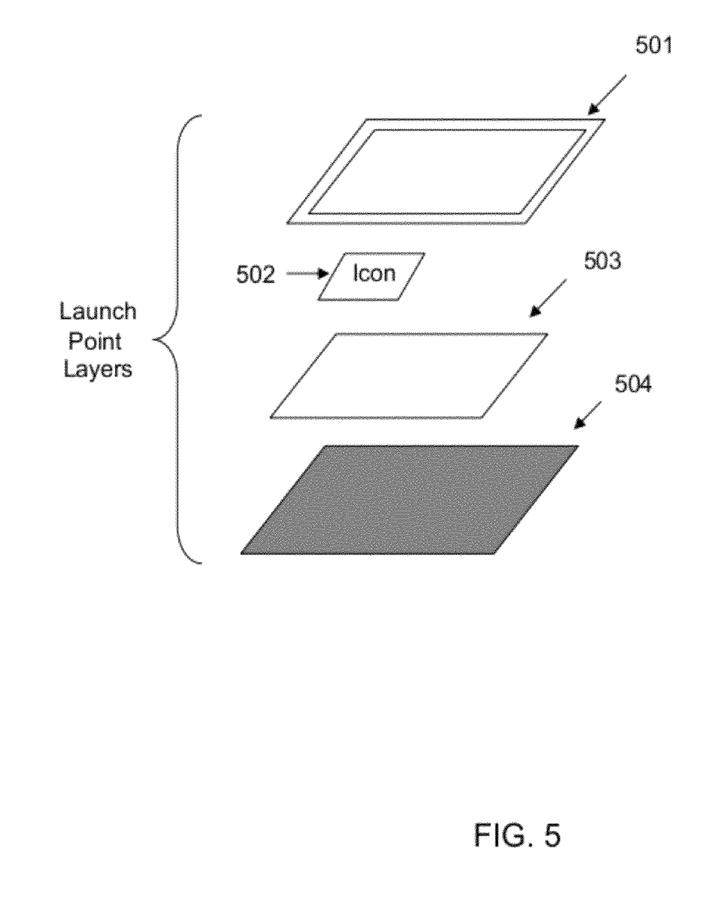
FIG. 5 illustrates an example of launch point layers.

Referring to FIG. 5, a launch point may be made up of layers, composed together to form a final view. An outline 501 (for example, light grey: RGB 229, 229, 229; hex: e5e5e5) may be provided. A application (product) icon 502, which may be implemented by using a 48×48 pixel version of the product icon may be provided as another layer. A screen capture 503 of the application (for example, obtained when the user opens the application) of the UI of the application may be provided as another layer. The screen capture 503 may only appear after the first launching of the application, or it may be provided with a default screen capture, for example if the application is common. If no screen capture 503 is available, the application icon 502 may simply be used until one is obtained or in lieu of one (on a blank launch point background). A drop shadow 504 (for example, 5 pixels wide) may be provided as a layer, as illustrated for example to provide a border for the outline layer 501.

Figure 6:
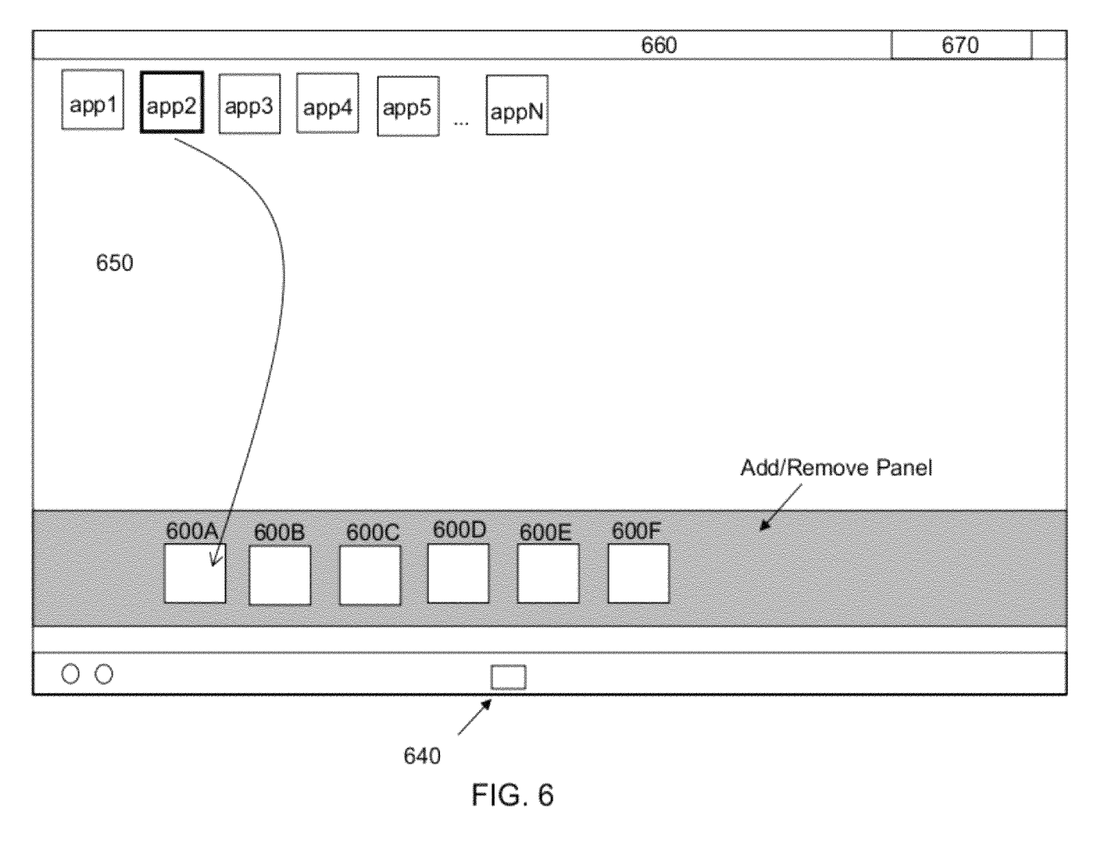
FIG. 6 illustrates an example settings editing arrangement.
Figure 7:
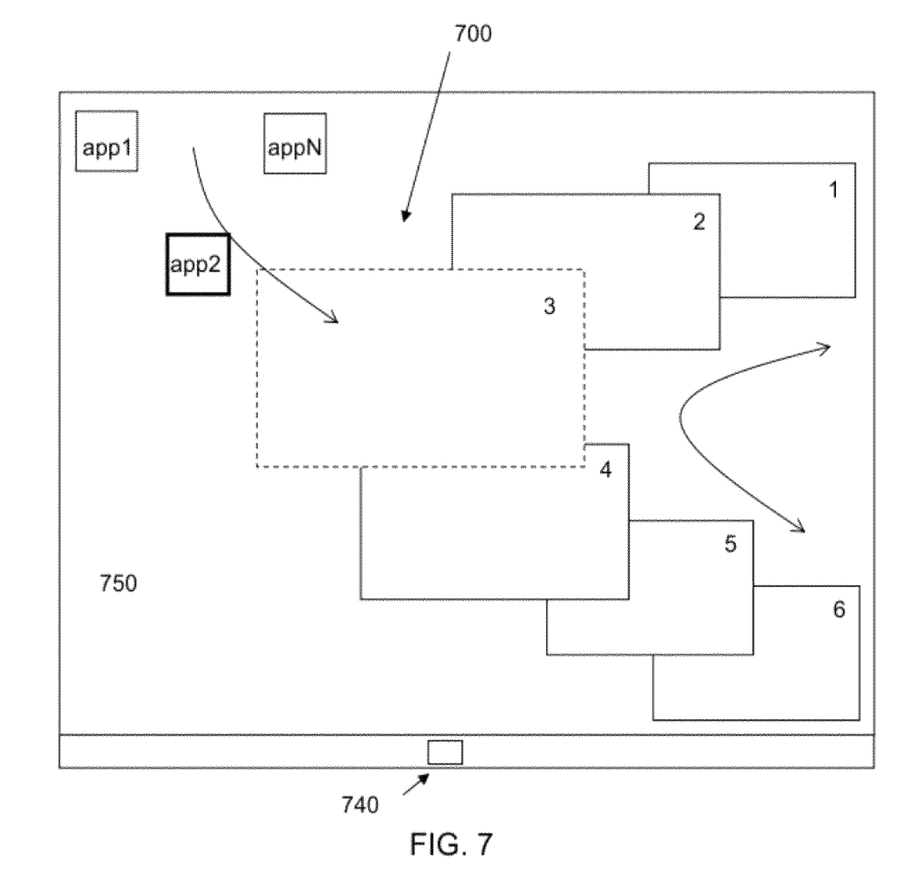
FIG. 7 illustrates an example settings editing arrangement.

Referring to FIGS. 6-7, adding/removing launch points (1-6) to a favorite applications utility may be accomplished in a variety of ways. Some default applications may be provided in the utility as a starting point, which may be edited by a user. Referring to FIG. 6, a user may add launch points to the favorite applications utility wheel for example via a long press on the favorite applications dock/icon 640 toolbar to open an add/remove panel editing arrangement. Referring to FIG. 7, a user may alternatively simply open the favorite applications utility 700 via a long press on the icon 740 and drag an application icon from the (background) desktop 750 to an empty slot (for example, (1) in FIG. 7) on the wheel. If the user has no empty slots, then the add/remove panel may open. To remove launch points from the favorite applications utility, a user may give a long press to the dock icon (640, 740) on the toolbar and open the add/remove panel.

Referring to FIG. 6, for adding launch points within add/remove panel, to add an application to a launch point the user presses on an application icon (for example, "app2"), then drags it down the page to the launch point slot area using the touchscreen. The user then drops the application icon onto an open slot in the add/remove panel (for example, into empty slot 600A of empty slots 600A-600F). The version of the application icon (app2 in this example) in the icon library (background/desktop 650) may become translucent (for example, 50%) or highlighted in some fashion to indicate it has been selected. The application icon on the launch point (600A) may be displayed in the lower left-hand corner. When there are no empty launch points remaining in the add/remove panel, the background may indicate the favorite applications utility slots have been filled (for example, change to a shade of red).

To remove an application from a launch point, the user may press and hold the launch point to be cleared. Then, the user may drag the application icon of the launch point into the applications library (background/desktop 650, 750) area (on the top of the view in FIG. 6). Once the application has been moved into the library area 650, 750, the application icon may be animated as flying back to its position in the library 650, 750. The launch point thus emptied may then be highlighted or otherwise visually indicated as having been acted on (for example, become 100% opaque).

Structural and design details of the add/remove panel (FIG. 6) may be varied. For example, the top ⅔ of the overall view may be dedicated to the applications library view (650), and the bottom ⅓ may be reserved for the launch points add/remove panel area. An action bar 660 may contain a button or link 670 to an application store at which the user may find and download more applications, as needed.

A variety of spacing may be applied to the elements of the views in FIGS. 6-7. For example, the launch points in the add/remove panel of FIG. 6 may be sized as 100 pixels tall by 160 pixels wide. A launch point may be set at 80 pixels from top of the add/remove panel area. Six (6) launch point slots (600A-600F) may be centered in the add/remove panel area in two rows of three (for a total of 6 in a portrait mode), or one row of six (in a landscape mode), or in some other suitable format. There may be spacing between each launch point slot (for example, 40 pixels between 600A and 600B) and spacing between rows (for example, 40 pixels between rows of the add/remove panel, if more than one row is utilized, not shown). There may be spacing to the bottom of the add/remove panel area from the bottom of the launch point slot, for example 40 pixels. In the applications library area 650, there may be spacing from top of screen to the application icons (for example, 100 pixels), and spacing between the application icons, taking into considering how many application icons are to appear in the library area 650. Application icons may be spaced evenly across the screen area 650, in as many rows as necessary.

Embodiments may be implemented in one or more information handling devices (computing devices) configured appropriately to execute program instructions consistent with the functionality of the embodiments as described herein. In this regard, FIG. 1 describes a non-limiting example of such a computing device. While mobile computing systems such as tablet computers and smart phones have been specifically mentioned as examples herein, embodiments may be implemented using other computing systems, such as desktops, workstations, servers and the like.

As will be appreciated by one skilled in the art, various aspects may be embodied as a system, method or computer program product. Accordingly, aspects may take the form of an entirely hardware embodiment or an embodiment including software that may all generally be referred to herein as a "circuit," "module" or "system." Furthermore, aspects may take the form of a computer program product embodied in one or more computer readable medium(s) having computer readable program code embodied thereon.

Any combination of one or more non-signal computer readable medium(s) may be utilized. The non-signal computer readable medium may be a computer readable storage medium. A computer readable storage medium may be, for example, an electronic, magnetic, optical, electromagnetic, infrared, or semiconductor system, apparatus, or device, or any suitable combination of the foregoing. More specific examples of a computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a computer readable medium may be transmitted using any appropriate medium, including but not limited to wireless, wireline, optical fiber cable, RF, etc., or any suitable combination of the foregoing.

Computer program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, apparatuses and computer program products according to various example embodiments. It will be understood that the actions and functionality illustrated may be implemented at least in part by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions/acts specified.

The computer program instructions may also be stored in a computer readable medium that can direct a computer, other programmable data processing apparatus, or other device(s) to function in a particular manner, such that the instructions stored in the computer readable medium produce an article of manufacture including instructions which implement the function/act specified.

The computer program instructions may also be loaded onto a computer, other programmable data processing apparatus, or other device(s) to cause a series of operational steps to be performed on the computer, other programmable apparatus or other device(s) to produce a computer implemented process such that the instructions which execute on the computer or other programmable apparatus provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method comprising:
providing a toolbar on a display device of an information handling device;
providing, within the toolbar, a dock point on the display device of the information handling device, said dock point being a consistent point among scrollable desktop views;
responsive to user input associated with said dock point, determining if the user input is a settings input;
launching a utility that animates a display organizing a sub-set of user applications installed on said information handling device in a predetermined arrangement of application icon launch points if the input is not settings input;
launching a utility that allows for user modification of the sub-set of user applications displayed on said information handling device if the input is settings input;
said utility overlaying an underlying desktop view and providing an animated movement of said application icon launch points in said utility responsive to user input;
said utility organizing the application icon launch points in a wheel arrangement with overlapping tiles extending from a side of the display device and arcing towards a central portion of the display device; and
responsive to user input selecting an application icon launch point in said utility, launching an application associated with said application icon launch point on the information handling device.

2. The method according to claim 1, further comprising providing an editing arrangement for editing the sub-set of applications represented in said utility.

3. The method according to claim 2, wherein said editing arrangement comprises an add/remove panel displayed on said display device.

4. The method according to claim 3, further comprising:
responsive to user input at said add/remove panel, performing one or more of:
adding an application from an application library area of said display device to an unoccupied launch point slot in said add/remove panel; and
removing an application from an occupied launch point slot in said add/remove panel to an application library of said display device.

5. The method according to claim 2, wherein said editing arrangement comprises a wheel arrangement having one or more unoccupied launch point slots.

6. The method according to claim 5, further comprising, responsive to user input dragging an application icon from a library area of said display device to an unoccupied launch point slot in said wheel arrangement, populating said empty launch point with said application.

7. The method according to claim 1, wherein said utility organizing a sub-set of user applications installed on said information handling device in a predetermined arrangement of launch points comprises a utility organizing the sub-set of user applications in a wheel arrangement centered about lower corner of said display device.

8. The method according to claim 1, further comprising:
responsive to user input, providing animated movement of said launch points in a wheel like motion.

9. The method according to claim 1, wherein the launch points comprise four layers comprising an application icon, including:
an outline layer, an icon layer, a screen capture layer, and a shadow layer;
said screen capture layer associated with a view of user interface content of an underlying application associated with a particular launch point.

10. The method of claim 1, wherein the overlapping tiles are differentially sized.

11. The method of claim 10, wherein the overlapping tiles increase in size as they are animated towards the central portion of the display device.

12. A system comprising:
one or more processors; and
a display device;
wherein, responsive to execution of computer program instructions accessible to the one or more processors, the one or more processors:
provide a toolbar on the display device of said system;
provide, within the toolbar, a dock point on the display device of said system, said dock point being a consistent point among scrollable desktop views;
responsive to user input associated with said dock point, determining if the user input is a settings input;
launch a utility that allows for user modification of the sub-set of user applications displayed on said system if the input is settings input;
launch a utility organizing a sub-set of user applications installed on said system in a predetermined arrangement of application icon launch points;
said utility overlaying an underlying desktop view and providing an animated movement of said application icon launch points in said utility responsive to user input;
said utility organizing the application icon launch points in a wheel arrangement with overlapping tiles extending from a side of the display device and arcing towards a central portion of the display device; and
responsive to user input selecting an application icon launch point in said utility, launching an application associated with said application icon launch point on said system.

13. The system according to claim 12, wherein, responsive to execution of computer program instructions accessible to the one or more processors, the one or more processors:
provide an editing arrangement for editing the sub-set of applications represented in said utility.

14. The system according to claim 13, wherein said editing arrangement comprises an add/remove panel displayed on said display device.

15. The system according to claim 14, wherein, responsive to execution of computer program instructions accessible to the one or more processors, the one or more processors:
responsive to user input at said add/remove panel, perform one or more of:
adding an application from an application library area of said display device to an unoccupied launch point slot in said add/remove panel; and
removing an application from an occupied launch point slot in said add/remove panel to an application library of said display device.

16. The system according to claim 13, wherein said editing arrangement comprises a wheel arrangement having one or more unoccupied launch point slots.

17. The system according to claim 16, wherein, responsive to execution of computer program instructions accessible to the one or more processors, the one or more processors:
responsive to user input dragging an application icon from a library area of said display device to an unoccupied launch point slot in said wheel arrangement, populate said unoccupied launch point with said application.

18. The system according to claim 12, wherein said utility organizing a sub-set of user applications installed on said system in a predetermined arrangement of launch points comprises a utility organizing the sub-set of user applications in a wheel arrangement centered about lower corner of said display device.

19. The system according to claim 12, wherein, responsive to execution of computer program instructions accessible to the one or more processors, the one or more:
  responsive to user input, provide animated movement of said launch points in a wheel like motion.

20. A computer program product comprising:
  a non-transitory computer readable storage device having computer readable program code embodied therewith, the computer readable program code being executable by a processor and comprising:
  computer readable program code that provides a toolbar on a display device of an information handling device;
  computer readable program code that provides a dock point on the display device of the information handling device, said dock point being a consistent point among scrollable desktop views;
  computer readable program code that, responsive to user input associated with said dock point, determines if the user input is a settings input;
  computer readable program code that, launches a utility that allows for user modification of the sub-set of user applications displayed on said information handling device if the input is settings input;
  computer readable program code that, launches a utility organizing a sub-set of user applications installed on said information handling device in a predetermined arrangement of application icon launch points;
  said utility overlaying an underlying desktop view and providing an animated movement of said launch points in said utility responsive to user input;
  said utility organizing the application icon launch points in a wheel arrangement with overlapping files extending from a side of the display device and arcing towards a central portion of the display device; and
  computer readable program code that, responsive to user input selects an application icon launch point in said utility, launch an application associated with said application icon launch point on the information handling device.

\* \* \* \* \*